(12) United States Patent
Cai et al.

(10) Patent No.: US 10,044,862 B1
(45) Date of Patent: Aug. 7, 2018

(54) DYNAMIC TOPIC GUIDANCE IN THE CONTEXT OF MULTI-ROUND CONVERSATION

(71) Applicant: International Business Machines Corporation, Armonk, NY (US)

(72) Inventors: Keke Cai, Beijing (CN); Jing Ding, Shanghai (CN); Li Zhang, Beijing (CN); Shiwan Zhao, Beijing (CN); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/581,798

(22) Filed: Apr. 28, 2017

(51) Int. Cl.
| | | |
|---|---|---|
| *H04M 3/00* | (2006.01) | |
| *H04M 5/00* | (2006.01) | |
| *H04M 3/51* | (2006.01) | |
| *G06Q 10/06* | (2012.01) | |
| *G06N 3/08* | (2006.01) | |
| *G10L 25/63* | (2013.01) | |

(Continued)

(52) U.S. Cl.
CPC ............ *H04M 3/5175* (2013.01); *G06N 3/08* (2013.01); *G06Q 10/06316* (2013.01); *G10L 15/1815* (2013.01); *G10L 25/63* (2013.01); *G10L 25/87* (2013.01); *H04M 2203/256* (2013.01); *H04M 2203/551* (2013.01)

(58) Field of Classification Search
CPC .. G10L 15/00; G06Q 10/06; G06Q 10/06316; G06Q 30/016; H04L 51/02; H04L 51/046; H04L 51/24; H04L 51/30; H04M 2203/40; H04M 2203/401; H04M 2203/2011; H04M 2203/2061; H04M 2242/00; H04M 2242/08; H04M 2242/12; H04M 3/2281; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04W 4/14
USPC ........................................ 379/210.01–266.1
See application file for complete search history.

(56) References Cited

U.S. PATENT DOCUMENTS

| | | | |
|---|---|---|---|
| 8,359,227 | B2 | 1/2013 | Wan et al. |
| 8,370,155 | B2 | 2/2013 | Byrd et al. |

(Continued)

OTHER PUBLICATIONS

Mel, et al. "The NIST Definition of Cloud Computing". Recommendations of the National Institute of Standards and Technology, Nov. 16, 2015.

(Continued)

*Primary Examiner* — Khai N Nguyen
(74) *Attorney, Agent, or Firm* — Vazken Alexanian; McGinn IP Law Group, PLLC

(57) ABSTRACT

A topic guidance method, system, and computer program product for creating a conversation model by learning a conversation pattern from a customer response to a conversation topic segment and suggesting a conversation topic for the agent to engage the customer in the conversation topic based on a customer response associated with the conversation model.

20 Claims, 4 Drawing Sheets

(51) Int. Cl.
*G10L 15/18* (2013.01)
*G10L 25/87* (2013.01)

(56) References Cited

U.S. PATENT DOCUMENTS

| | | | | |
|---|---|---|---|---|
| 9,350,690 | B2* | 5/2016 | Meijer | G06F 15/16 |
| 9,596,196 | B1* | 3/2017 | Hills | H04L 51/00 |
| 2010/0082751 | A1* | 4/2010 | Meijer | G06F 15/16 |
| | | | | 709/206 |
| 2014/0314225 | A1 | 10/2014 | Riahi et al. | |
| 2015/0172236 | A1* | 6/2015 | Meijer | G06F 15/16 |
| | | | | 709/206 |
| 2015/0201077 | A1 | 7/2015 | Konig et al. | |
| 2015/0256675 | A1 | 9/2015 | Sri et al. | |
| 2016/0100057 | A1 | 4/2016 | Perez | |
| 2016/0163311 | A1* | 6/2016 | Crook | G10L 15/183 |
| | | | | 704/275 |
| 2016/0191709 | A1 | 6/2016 | Pullamplavil et al. | |
| 2017/0140755 | A1* | 5/2017 | Andreas | G06F 17/241 |
| 2017/0180276 | A1* | 6/2017 | Gershony | H04L 51/02 |

OTHER PUBLICATIONS

Aphrodite Brinsmead "Real-time speech analytics delivers smoother customer engagements" Four scenarios for implementing real-time tools in the enterprise. An Ovum White Paper, Avaya (an Informal Telecoms & Media Company) Engage the power of We, Feb. 2015.

\* cited by examiner

100

DYNAMIC TOPIC GUIDANCE IN THE CONTEXT OF MULTI-ROUND CONVERSATION

BACKGROUND

The present invention relates generally to a topic guidance method, and more particularly, but not by way of limitation, to a system, method, and computer program product for providing dynamic topic guidance to an agent during a multi-round conversation to assist the agent to make a successful sale.

Conventionally, in call-centers, out-bound call agents try to sell the products to customers through multi-round conversation. Typically, a new agent does not have much skill to choose proper topics during the conversation to make the conversation smoothly moving forward and handle customer in different situation. That is, the conventional techniques and agent assistance tools focus on helping an agent to answer questions rather than actively choosing topics and making the conversation continue smoothly to lead to a successful sale.

SUMMARY

In an exemplary embodiment, the present invention can provide a computer-implemented topic guidance method for a call between an agent and a customer, the method including creating a conversation model by learning a conversation pattern from historical customer and agent conversation episodes and suggesting a conversation topic for the agent to engage the customer in the conversation based on a customer response state associated with the conversation model. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
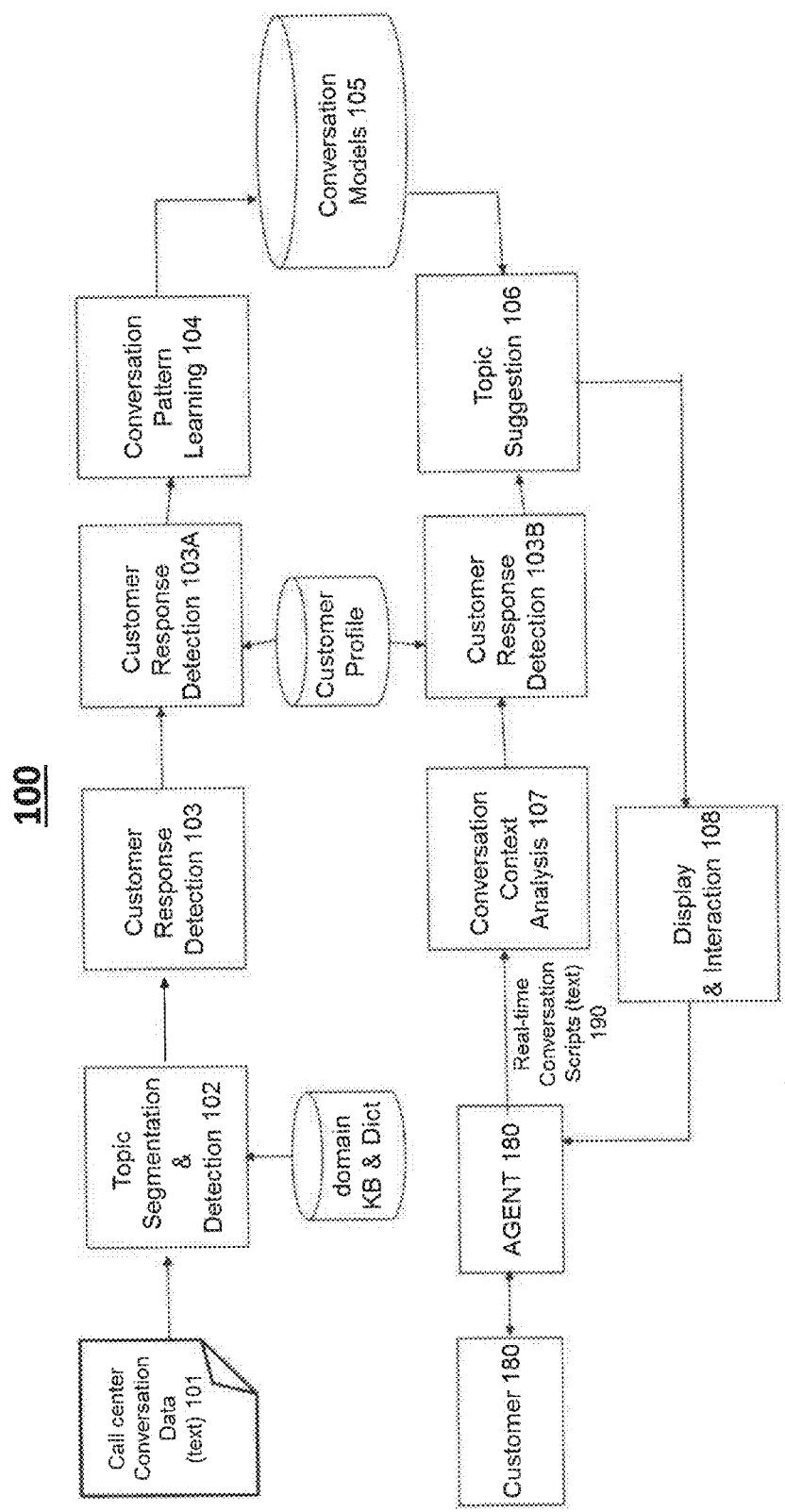
FIG. 1 exemplarily shows a high-level flow chart for a topic guidance method 100 according to an embodiment of the present invention.

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a topic guidance method 100 according to the present invention can include various steps for providing dynamic topic guidance to an agent during a multi-round conversation to help him to make a successful selling. The steps can build a conversation model with successful and unsuccessful recorded dialog for all the agent and customers in the history. And, in the run-time, when an agent starts a call with the customer, the method can detect, in real-time, the agent's topic and customer's current state, according to this context, the system will dynamically provide topic suggestion to the agent.

Figure 3:
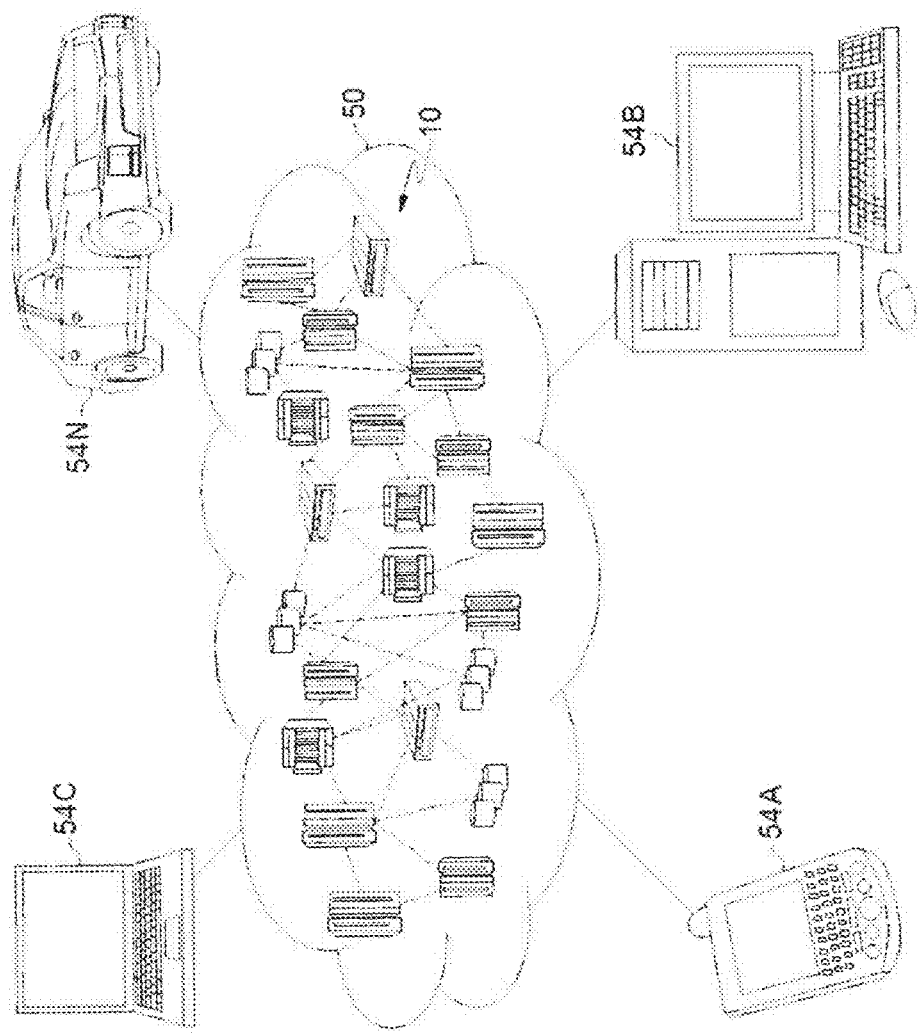
FIG. 3 depicts a cloud-computing environment 50 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Although one or more embodiments may be implemented in a cloud environment 50 (see e.g., FIG. 4), it is nonetheless understood that the present invention can be implemented outside of the cloud environment.

Referring now to FIG. 1, the method 100 receives call center conversation data (text) 101. That is, the method receives historical data from past calls related to the type(s) of conversation between the agent and the customer. For example, call center conversation data can include a length of conversation about a topic, a type of topic (e.g., the weather, sports, family, etc.), a tone of the conversation, a reaction of the customer or agent to the conversation, etc.

In step 102, the topics of conversation are detected and segmented from the call center conversation data using a domain knowledge base (KB) and dictionary. In other words, the raw data files for each phone conversation between an agent and customer are filtered to detect the types of conversation (i.e., differentiate the conversation of the sale, a topic, between topics, etc.) and segment call into the conversation.

In step 103, the customer response to each topic is detected. That is, the topics are segmented into topic segments in step 102 and a response of the customer to each segmented topic is detected. Thus, through the customer's answers to the agent, the customer's state can be detected and if the conversation is successful continued or not. The response can include a verbal, emotional, or result based response. For example, a verbal response can be a positive engaging verbal response when a certain topic is brought up. An emotional response can include laughter, anger, etc. And, a result based response can include the customer purchasing a product sold by the agent as a result of the conversation. It is noted that the customer response is further used to categorize each customer based on their response to a topic in order to suggest topics (as described later). For example, each customer with a positive verbal response to an agent engaging the customer in conversation about their children (family) will be categorized into a pool of customers that enjoy talking about their family (or more generally enjoy an agent who engages them on a personal level). In this manner, customers can be categorized such that the topics suggested are based on a cohort having similar responses to conversation (i.e., topics suggested to customers who enjoy talking about their family may be similar and thus result in a better experience to ultimately result in a sale).

Further, in step 103A, a customer state is constructed after the customer response is detected and after the conversation text is analyzed (as described later). The customer's state is a large feature vector including many dimensions (elements) such as customer's response emotion, verbal feature, customer category, talking time so far, history transaction, contacted frequency, personality, demographic information (age, gender, race, income, marital status, employment status, nationality and political preference) etc. Some of the features are from conversation analysis result, some of the features are from customer profile database. Thus, when the agent talked about one topic, when the customer's response is obtained, the invention will analyze his/her emotion, update the talking time so far, and combine with the other dimensions such as history transaction, contacted frequency, demographic information etc. to compose a customer's state.

In step 104, conversation patterns are learned in order to build a conversation model in step 105. That is, reinforcement learning is leveraged to build the conversation model, which modeling the action that can lead to success selling in the end of the conversation. The action in the conversation model is the topic agent talks. For example, the customer responses to the topics from historical data can be used to learn in order to create a conversation model (i.e., a model predicting what conversation topic will mostly likely to lead to a positive result from the customers responses to conversation). Each episode (i.e., each individual conversation) can be analyzed to learn the model. Of course, the conversation model can be broadly built for a cohort of users categorized together due to similar responses as discussed in step 103. In the training phase, the next best action is trained with all customer's conversation episode, not only use similar customers that have the same topics/response in a particular time point.

In some embodiments, the conversation process can include a Markov Decision Process (https://en.wikipedia.org/wiki/Markov_decision_process), <S, A, P, R, γ>, where, S is a finite set of states, could be customer state constructed in step 103A (customer state could include emotion, talking time so far, history transaction, contacted frequency, demographic information, etc., as described in step 103A); A is a finite set of actions, could be discussion topics; P is the probability that action in state s at time t will lead to another state s' at time t+1; R is reward, intermediate reward is 0, successful ending is 1, unsuccessful ending is −1, and γ is a discount factor, γ∈[0,1]. Thus, after each state, a best action can be defined according to the state. The agent can take the action of which a reward value is feedback to either increase or decrease the confidence in the action.

Q-learning is fit to solve the problem, it is model free and can be used to find an optimal action-selection policy for any given (finite) Markov decision process (see reference: https://en.wikipedia.org/wiki/Q-learning).

Q-learning can be performed as the learning technique in step 104 to learn the conversation patterns for making the conversation model. The Q-learning uses the formula [1] where:

$$Q(S, A) \leftarrow Q(S, A) + \alpha\left(R + \gamma\max_{a'} Q(S', a') - Q(S, A)\right) \quad [1]$$

The algorithm there has a function that calculates the Quantity of a state-action combination Q: S×A→R. Before the learning has started, Q returns an (arbitrary) fixed value, chosen by the designer. Then, each time the agent selects an action and observes a reward, a new state that may depend on both the previous state and the selected action, Q is updated. Then, iteration occurs and assumed the old value and makes a correction based on the new information.

Thus, the invention can leverage Q-Learning to learn the optimized policy for the conversation model.

Initialize Q(s, a), ∀s∈$, a∈𝒜 (s), arbitrarily, and Q(terminal-state, •)=0
Repeat (for each episode):
Initialize S
Repeat (for each step of episode):
  Take action A, observe R, S'
  Q(S, A)←Q(S, A)+α[R+γmax$_a$Q(S', a)−Q(S, A)]
  S←S';
until S is terminal That is, a value (Q) is determined for every state and action pair (Q(S, A)) with a reward (R) factored into the next pair (Q(S'a')). In other words, from each next state (S'), actions (A') can be calculated to take.

But due to the computation complexity of the embodied scenario and memory limitation, a more preferred approach is use deep q-network to learn the parameters of the model. That is, in a traditional Q-Learning algorithm, the value function Q is represented by a lookup table, every state-action pair (s,a) has an entry Q(s,a). In the present invention, there are too many states and actions, so that the combination of (s,a) will be too large to store in the memory, and too slow to learn.

Thus, the value function Q is estimated with function approximation, particularly, if we use neural network as the function, it is called Deep Q-networks. Thus, the value function can be represented by Q-network with a weight.

For example, a single Q-value can be calculated by inputting a state (or states) and an action input a network. Or, multiple Q-values can be calculated by inputting a single state into a network. Q-learning and deep Q-network is applied to train the conversation model and choose the best actions (the topic).

It is noted that steps 102-105 can be a "training phase" and steps 106-108 can be a "run-time phase". That is, the conversation models are continuously trained and updated using historical call conversation data 101.

Then, in a run-time phase (i.e., implementation), in step 106, topics are suggested to the agent to engage the customer in based on the conversation model and the real-time conversation being analyzed (i.e., the real-time conversation scripts 190 being analyzed) in step 107 to continuously suggest topics and change topics based on the customers reactions. Also, the customer state is constructed based on the customer profile after analyzing the context and before topic suggestion in step 106. In other words, the conversation text is analyzed, the customer's current state is composed, and then an action is suggested based on the current state vector, the context, and the conversation model.

For example, in the run-time phase, the model will not change, and it is applied directly to suggest the best topic to the agent. Because the training is time consuming, it may not be practical to be learn online with the ongoing conversation. Therefore, the current conversation could be added to the training data afterwards, in a batch model to re-train the model, or, if the computation capability is affordable, online training is also could be considered.

In this manner, an agent can try multiple topics if one should not elicit an expected response. Also, in step 108, the interaction between the agent and customer is displayed for the agent to track their conversation and potential new conversations. For example, the topic suggestion may include multiple topics of which multiple responses (or just the single best) can be expected. In one exemplary option, in a decision tree type manner, the conversations and their expected responses can be displayed to the agent in order to select the topic and then be aware of the expected response. Should the customer respond negatively (or not as expected in the decision tree), the agent can dynamically switch the topic.

Of course, it is preferable that only one suggested action use case is utilized by the agent as the topic suggested because the system's suggested is the 'best' according to the model, but the agent has much flexibility to choose his preferred or comfortable topic, it's also acceptable. But the method needs to rank the suggested topics to let the agent know which is better and how better it is such that the best (or multiple) are returned to the agent for the agent to select which action to take.

Therefore, in the run time, the next actions (topics) to take is based on the learned model and the current state (all of the features generated as the state vector) where they are, not only based on the customer's feedback on the topic the agent talked about.

For example, during the conversation if a customer has a particular response to conversation matching (or similar to) that of a conversation model, the agent is notified of this similarity and suggested to engage the customer in the topic. That is, if the agent is commenting on a hockey game and the customer refers the agent to the recent standings in the hockey league, the customer state can be detected as excited (i.e., a positive customer state), and then the conversation model can trigger for the agent to change the topic to "hockey playoffs" because past customers have had a positive outcome when further engaging conversation around a sports team. Or, if the agent asks about the weather but the customer lives in Buffalo, N.Y. which has terrible weather during the winter, the customer may have a negative response to which a topic is suggested to the agent to avoid weather conversation.

Therefore, in the run time, the next actions (topics) to take is based on the learned model and the current state (all of the features generated as the state vector) where they are, not only based on the customer's feedback on the topic the agent talked about.

Thus, in step 106, topics are suggested to the agent to engage the customer in based on the customer reactions or responses to the current conversation.

Therefore, the "training phase" can train the conversation model but the continuous interactions with customers can dynamically update the conversation model to more accurately suggest topics.

Thereby, the method 100 can build a conversation model with successful and unsuccessful recorded dialog for all the agent and customers in the history. For each call, the method can detect all the topics along the conversation as well as the corresponding sentences to express the topics, and through the customer's answers to the agent, the method can detect customer's emotion and if the conversation is successful continued or not, then based on the history data, the system can learn a conversation model. Based on the conversation model, in the run-time, when an agent started a call with the customer, the method will real-time detect the agent's topic and customer's answers, according to this context, the method will compose the current customer state and use the learned conversation model to dynamically provide topic suggestion as well as the best practice sentences the agent could use. Accordingly, the invention can provide dynamic topic guidance to the agent to help the agent to make successful sales.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
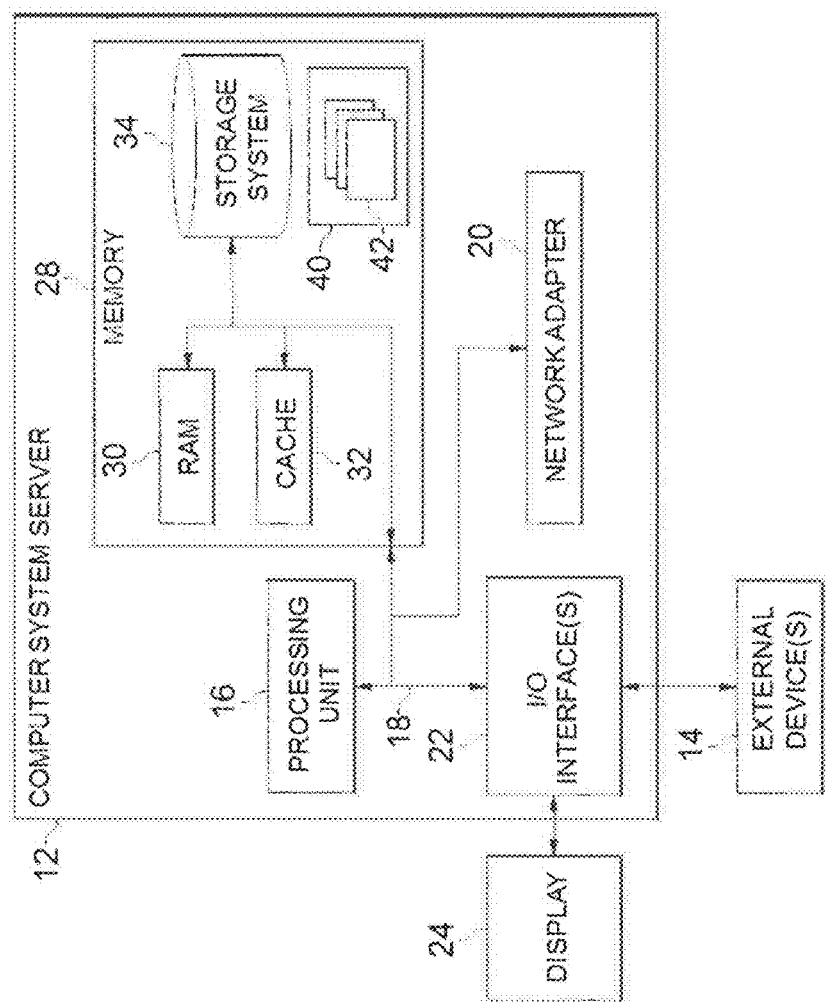
FIG. 2 depicts a cloud-computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
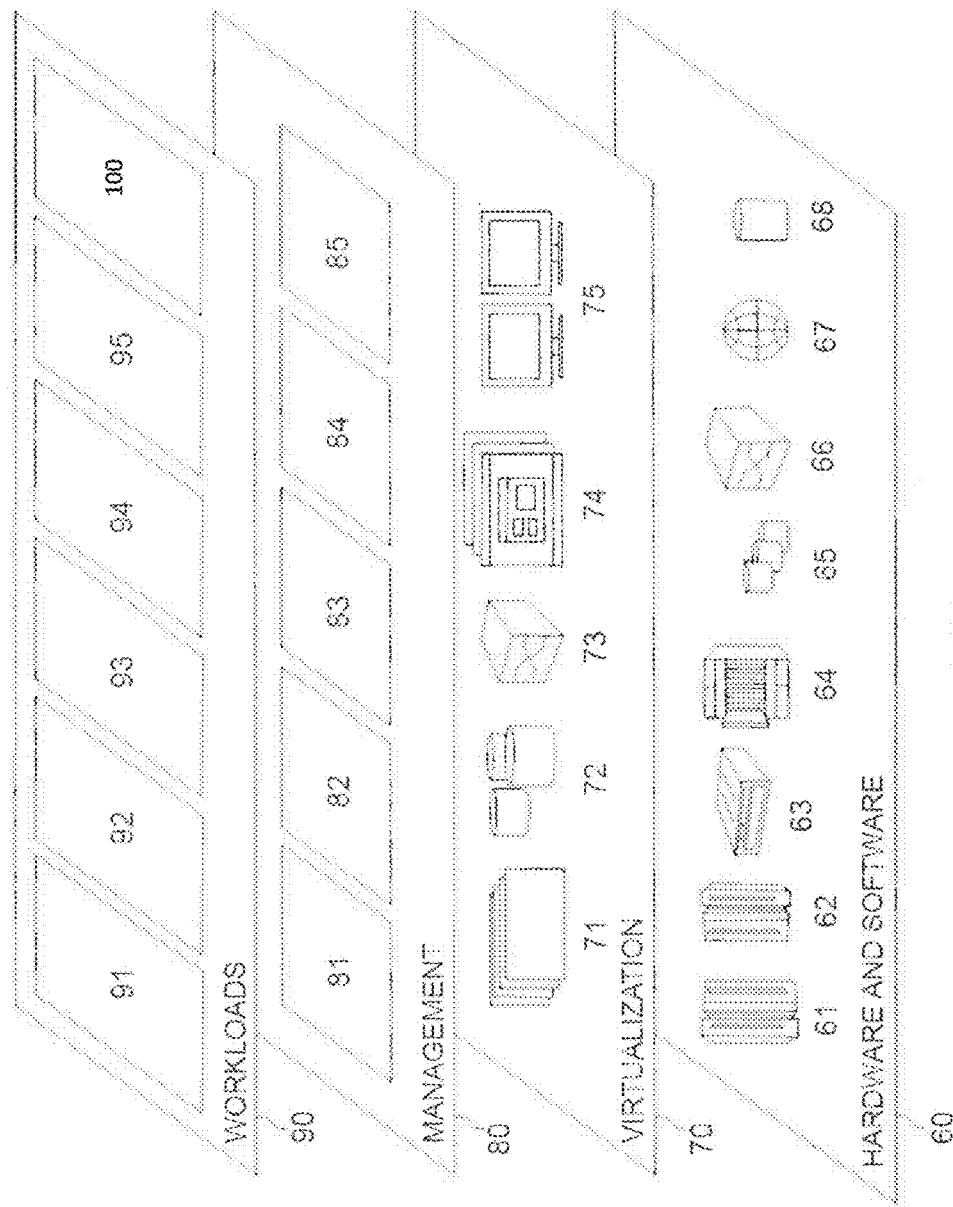
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and topic guidance method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented topic guidance method for a call between an agent and a customer, the method comprising:
    creating, via a processor on the computer, a conversation model by learning a conversation pattern from a customer response to a conversation topic segment, a current state of the customer, and a context of the conversation topic segment; and
    suggesting, via the processor on the computer, a conversation topic for the agent to engage the customer in the conversation topic based on a customer response associated with the conversation model, analyzed conversation text the current state of the customer, and the context of the conversation topic segment.

2. The computer-implemented method of claim 1, wherein:
    in a training phase of the conversation model:
        historical call conversation data is segmented into conversation segment topics;
        the customer response in the historical call conversation data is detected in response to each of the conversation segment topics;
        construct a customer state; and
        the conversation pattern is learned by learning a pattern of customer responses to the conversation segment topics in order to create the conversation model; and
    in a run-time phase of the conversation model:
        the suggesting suggests the conversation topic for which the agent to engage the customer; and
        a real-time response to the suggested topic is analyzed to dynamically adapt the suggested conversation topic based on the conversation model being referenced for the real-time customer response to the conversation topic.

3. The computer-implemented method of claim 1, wherein the suggested conversation topic is displayed in a decision-type tree of which multiple conversation topics are displayed with an expected customer response derived from the conversation model.

4. The computer-implemented method of claim 1, wherein the conversation model is learned by a Markov Decision Process based on at least one of a finite set of states, a finite set of actions, and a discount factor.

5. The computer-implemented method of claim 4, wherein the finite set of states includes an emotion, a talking time, a historical transaction, a contacted frequency, a demographic information, and a customer category, and
wherein the finite set of actions includes conversation topics.

6. The computer-implemented method of claim 1, wherein one of a Q-learning technique and a deep Q-network is used in the creating to create the conversation model.

7. The computer-implemented method of claim 1, embodied in a cloud-computing environment.

8. A computer program product for topic guidance for a call between an agent and a customer, the computer program product comprising a computer readable storage device having program instructions embodied therewith, the program instructions executable by a computer to cause the computer to perform:
creating a conversation model by learning a conversation pattern from a customer response to a conversation topic segment, a current state of the customer, and a context of the conversation topic segment; and
suggesting a conversation topic for the agent to engage the customer in the conversation topic based on a customer response associated with the conversation model, analyzed conversation text the current state of the customer, and the context of the conversation topic segment.

9. The computer program product of claim 8, wherein:
in a training phase of the conversation model:
historical call conversation data is segmented into conversation segment topics;
the customer response in the historical call conversation data is detected in response to each of the conversation segment topics;
construct a customer state; and
the conversation pattern is learned by learning a pattern of customer responses to the conversation segment topics in order to create the conversation model; and
in a run-time phase of the conversation model:
the suggesting suggests the conversation topic for which the agent to engage the customer; and
a real-time response to the suggested topic is analyzed to dynamically adapt the suggested conversation topic based on the conversation model being referenced for the real-time customer response to the conversation topic.

10. The computer program product of claim 8, wherein the suggested conversation topic is displayed in a decision-type tree of which multiple conversation topics are displayed with an expected customer response derived from the conversation model.

11. The computer program product of claim 8, wherein the conversation model is learned by a Markov Decision Process based on at least one of a finite set of states, a finite set of actions, and a discount factor.

12. The computer program product of claim 11, wherein the finite set of states includes an emotion, a talking time, a historical transaction, a contacted frequency, a demographic information, and a customer category, and
wherein the finite set of actions includes conversation topics.

13. The computer program product of claim 8, wherein one of a Q-learning technique and a deep Q-network is used in the creating to create the conversation model.

14. A topic guidance system for a call between an agent and a customer, said system comprising:
a processor; and
a memory, the memory storing instructions to cause the processor to perform:
creating a conversation model by learning a conversation pattern from a customer response to a conversation topic segment, a current state of the customer, and a context of the conversation topic segment; and
suggesting a conversation topic for the agent to engage the customer in the conversation topic based on a customer response associated with the conversation model, analyzed conversation text, the current state of the customer, and the context of the conversation topic segment.

15. The system of claim 14, wherein:
in a training phase of the conversation model:
historical call conversation data is segmented into conversation segment topics;
the customer response in the historical call conversation data is detected in response to each of the conversation segment topics;
construct a customer state; and
the conversation pattern is learned by learning a pattern of customer responses to the conversation segment topics in order to create the conversation model; and
in a run-time phase of the conversation model:
the suggesting suggests the conversation topic for which the agent to engage the customer; and
a real-time response to the suggested topic is analyzed to dynamically adapt the suggested conversation topic based on the conversation model being referenced for the real-time customer response to the conversation topic.

16. The system of claim 14, wherein the suggested conversation topic is displayed in a decision-type tree of which multiple conversation topics are displayed with an expected customer response derived from the conversation model.

17. The system of claim 14, wherein the conversation model is learned by a Markov Decision Process based on at least one of a finite set of states, a finite set of actions, and a discount factor.

18. The system of claim 17, wherein the finite set of states includes an emotion, a talking time, a historical transaction, a contacted frequency, a demographic information, and a customer category, and
wherein the finite set of actions includes conversation topics.

19. The system of claim 14, wherein one of a Q-learning technique and a deep Q-network is used in the creating to create the conversation model.

20. The system of claim 14, embodied in a cloud-computing environment.

* * * * *